(12) United States Patent
Hu

(10) Patent No.: US 9,329,418 B2
(45) Date of Patent: May 3, 2016

(54) TRAY HAVING LIMITING STRUCTURES

(71) Applicant: Shenzhen China Star Optoelectronics Technology Co., Ltd., Shenzhen, Guangdong (CN)

(72) Inventor: Qianshuang Hu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 211 days.

(21) Appl. No.: 13/980,050

(22) PCT Filed: Jun. 24, 2013

(86) PCT No.: PCT/CN2013/077810
§ 371 (c)(1),
(2) Date: Jul. 17, 2013

(87) PCT Pub. No.: WO2014/183320
PCT Pub. Date: Nov. 20, 2014

(65) Prior Publication Data
US 2014/0340610 A1   Nov. 20, 2014

(30) Foreign Application Priority Data

May 14, 2013 (CN) .......................... 2013 1 0176669

(51) Int. Cl.
*G02F 1/1333* (2006.01)

(52) U.S. Cl.
CPC ............. *G02F 1/133308* (2013.01); *G02F 2001/133314* (2013.01); *G02F 2001/133322* (2013.01)

(58) Field of Classification Search
CPC ................................................ G02F 1/133308
See application file for complete search history.

(56) References Cited

U.S. PATENT DOCUMENTS

2012/0327327 A1* 12/2012 Joo ........................ H05K 1/189
349/58

FOREIGN PATENT DOCUMENTS

CN          102923394 A      2/2013

* cited by examiner

*Primary Examiner* — Phu Vu
(74) *Attorney, Agent, or Firm* — Andrew C. Cheng

(57) ABSTRACT

A tray having limiting structures for packaging an open cell LCD panel comprises a main body of tray having a recess for positioning the open cell LCD panel. The main body of tray further comprises limiting assemblies. The limiting assembly is connected to a bottom plate of the main body of tray in the gap between a PCB and a liquid crystal box of the open cell LCD panel. The limiting assembly is connected to the main body of tray. The limiting assembly can be mounted when it is used and removed when not used. The compatibility of the tray is thus expanded to fulfill the packaging requirements for the open cell LCD panel A and the open cell LCD panel B. The position of the limiting stopper of the limiting assembly is adjustable to effectively avoid the pull of the open cell LCD panel by the limiting assembly.

8 Claims, 4 Drawing Sheets

TRAY HAVING LIMITING STRUCTURES

BACKGROUND OF THE INVENTION

1. Field of the Invention

The present invention relates to a tray for positioning an open cell liquid crystal display (LCD) panel, more particularly to a tray having limiting structures.

2. Description of the Related Art

Nowadays, LCD panels are packaged in different ways. Some of them are mainly packaged with plastic discs, some of them are mainly packaged with injection boxes, and some of them are mainly packaged with foam products. LCD panels exist in two forms, which are cell type and open-cell type as defined by the industry. A cell LCD panel is a liquid crystal box formed by disposing liquid crystal molecules between two glass substrates, and its appearance is not different from the ordinary sheet glass. An open cell LCD panel is formed by disposing various ports on the cell LCD panel so that external signal sources are allowed to be connected. However, the open cell LCD panel does not comprise components such as backlight, bezel, etc. which always exist in the liquid crystal module (LCM).

Usually, more than one PC boards (PCBs) of the open cell LCD panel are connected by a flexible sheet. Such a flexible sheet, called as a chip-on-film (COF), is distributed with circuit to bridge signals between the open cell LCD panel and the PCBs. The open cell LCD panel is usually placed in a tray and kept flat, and the positioning devices of the tray are used for positioning the periphery of the open cell LCD panel. When the open cell LCD panel is subject to vibration, the PCBs tend to displace and pull the COF to cause damage to it. Hence, the product quality is impacted. Furthermore, since the COF is a flexible sheet, the PCBs tend to be carried into the gap between two liquid crystal boxes owing to the vibration. In the current packaging method for the open cell LCD panels, columns are directly formed when the plastic disc tray is formed. As shown in FIG. 1 and FIG. 2, an open cell LCD panel A 1 only has one COF 2, and two columns 5 of the tray 4 are used for stopping a PCB 3. Such a method is only suitable for a single tray for accommodating a very few open cell LCD panels. Once the number of the open cell LCD panels is large, the column 5 becomes taller. Due to the blockage of the columns 5, the PCB 3 tends to be hung on the columns 5 when placing and displacing the open cell LCD panel. As a result, the COF 2 is pulled and damaged to impact product quality. The capacity for the current used tray is four, and the columns 5 are simultaneously formed when the tray 4 is produced. Consequently, the universality of the tray 4 is questionable. In addition, please also refer to FIG. 3, if the tray 4 is intended to be used for accommodating an open cell LCD panel B 6 that has a plurality of COFs connecting with a PCB 8, the two centered COFs 7 will collide with the two columns 5 of the tray 4. The tray 4 is therefore not able to accommodate the open cell LCD panel B 6. For a tray being able to do so, a new mold needs to be made to fabricate trays for the open cell LCD panels B 6. As a result, the cost of the mold is a waste. Moreover, since the trays are used repeatedly, the package resource is also wasted to increase production cost if they are not applied universally.

SUMMARY OF THE INVENTION

The present invention provides a tray compatible with various open cell LCD panels to resolve the above-mentioned problems.

The present invention provides a tray having limiting structures for packaging an open cell LCD panel comprises a main body of tray. The main body of tray has a recess for positioning the open cell LCD panel. The main body of tray further comprises limiting assemblies. Each of the limiting assemblies is connected to a bottom plate of the main body of tray in the gap between a PCB and a liquid crystal box of the open cell LCD panel. The PCB is limited by the cooperation of the limiting assemblies.

In one aspect of the present invention, the limiting assembly is constituted by a spacing frame and a limiting stopper in the spacing frame.

In another aspect of the present invention, the spacing frame is a reverse U-shaped spacing frame, and two footings of the spacing frame extend towards two lateral sides and are on the same plane.

In another aspect of the present invention, an adhesive layer is disposed on a bottom of each of the two footings of the spacing frame to allow the spacing frame be stuck to the bottom plate of the main body of tray of the tray.

In another aspect of the present invention, the spacing frame is made of PET, PS, PP, or ABS.

In another aspect of the present invention, the limiting stopper is flexibly connected to the spacing frame.

In another aspect of the present invention, the limiting stopper is made of an anti-static buffer material.

In another aspect of the present invention, the limiting stopper is made of EVA or PE.

In another aspect of the present invention, the spacing frame is mounted on an outer side of the gap between the PC board and the liquid crystal box of the open cell liquid crystal display panel, the limiting stopper is slidingly connected to the spacing frame, and when the limiting stopper slides towards the chip-on-film to the extent that one of its ends completely enters into the spacing frame, at least one portion of the limiting stopper is engaged in the gap.

In another aspect of the present invention, anti-static buffer sheets are disposed on inner side walls of the main body of tray which are connected to the liquid crystal box.

In contrast to the prior art, the limiting assembly is connected to the main body of tray according to the present invention. The limiting assembly can be mounted when it is used and removed when it is not used. The compatibility of the tray is thus expanded to fulfill the packaging requirements for the open cell LCD panel A and the open cell LCD panel B. Furthermore, the position of the limiting stopper of the limiting assembly is adjustable to effectively avoid the pull of the open cell LCD panel by the limiting assembly. The anti-static buffer sheets disposed on the main body of tray can further protect the liquid crystal box.

DESCRIPTION OF THE EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
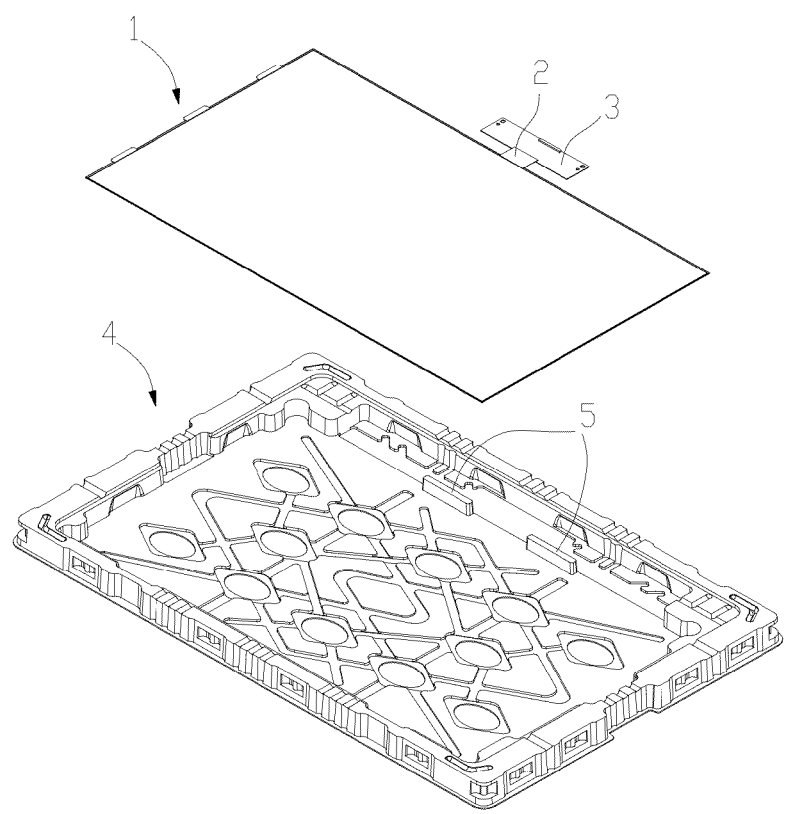
FIG. 1 is an exploded view of a conventional open cell LCD panel A and a tray.
Figure 2:
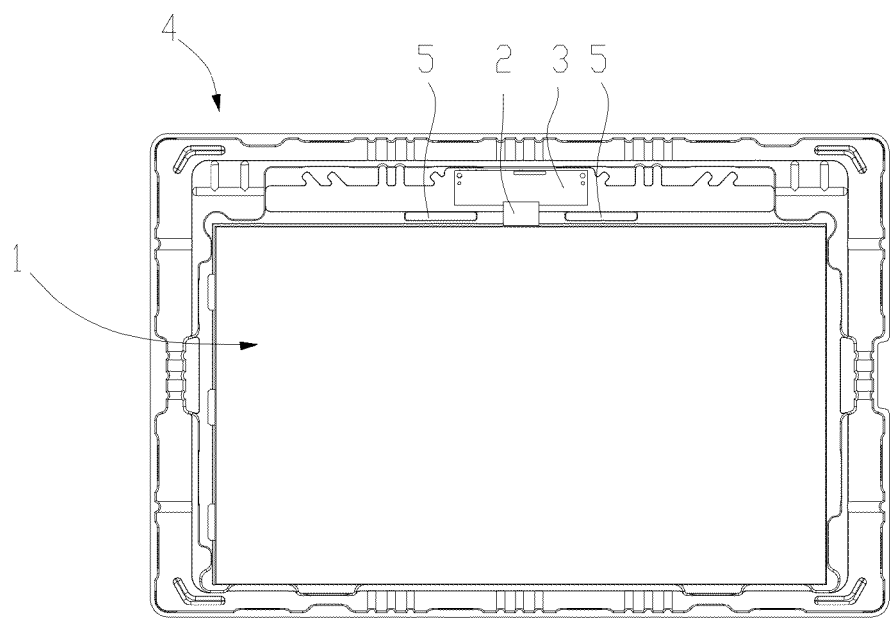
FIG. 2 is a front view of an assembly of the conventional open cell LCD panel A and the tray.
Figure 3:
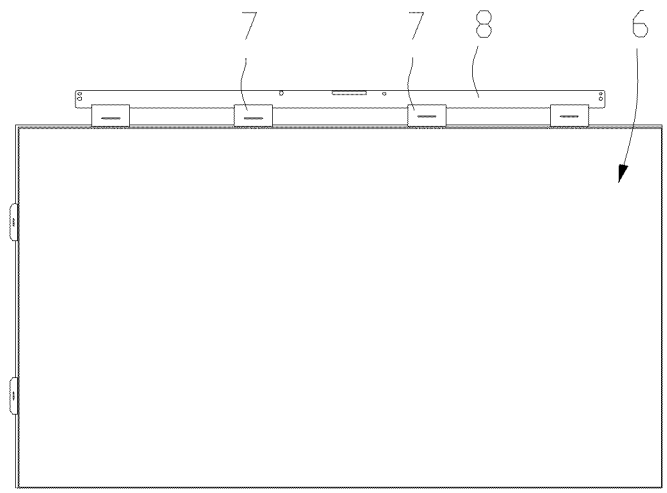
FIG. 3 is a schematic diagram showing a structure of a conventional open cell LCD panel B.
Figure 4:
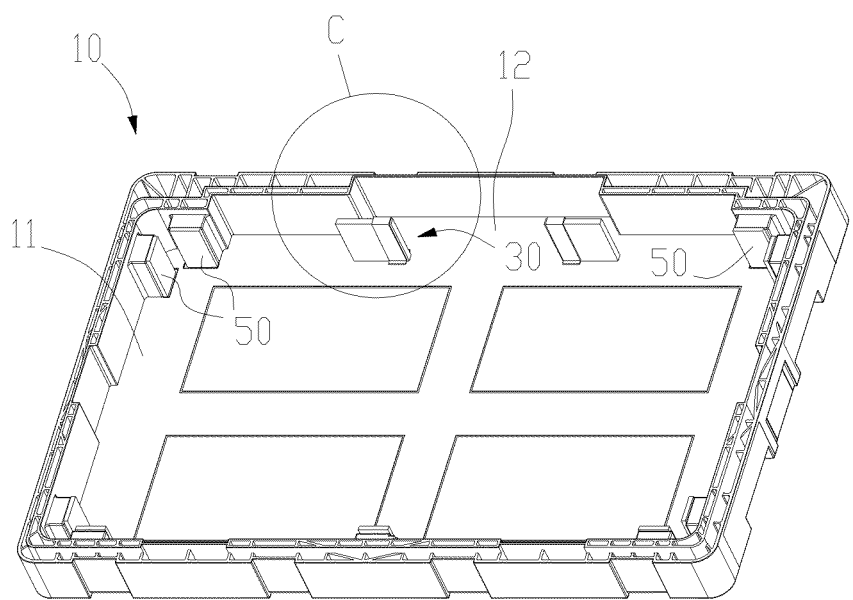
FIG. 4 is a schematic diagram showing a tray having limiting structures according to an embodiment of the present invention.
Figure 5:
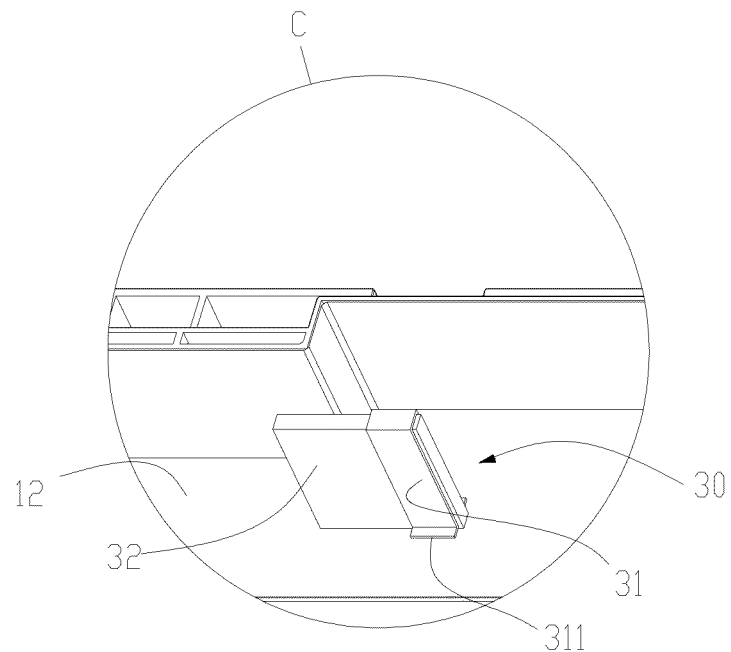
FIG. 5 is an enlarged view of portion C depicted in FIG. 4.
Figure 6:
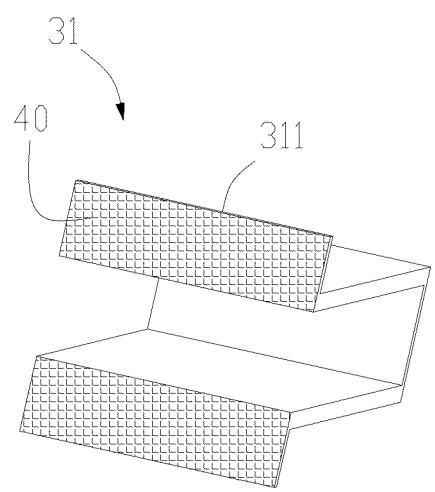
FIG. 6 is a schematic diagram showing a structure of a spacing frame according to an embodiment of the present invention.

As shown in FIG. 4, a tray used for positioning an open cell LCD panel comprises a main body of tray 10. The main body of tray 10 comprises a recess 11 for positioning the open cell LCD panel and limiting assemblies 30. Please also refer to FIG. 5, the limiting assembly 30 is fixed on a bottom plate of the main body of tray 12 in the gap between a PCB 23 and a liquid crystal box 22 of the open cell LCD panel A 20 (please refer to FIG. 7 and FIG. 8). The limiting assembly 30 is constituted by a spacing frame 31 and a limiting stopper 32 in the spacing frame 31. Please refer to FIG. 6, the spacing frame 31 is a reverse U-shaped spacing frame. Two footings 311 at two ends of the spacing frame 31 extend towards two lateral sides and are on the same plane. An adhesive layer 40 is disposed on a bottom of each of the two footings 311 of the spacing frame 31 so that it can be stuck to the bottom plate of the main body of tray 12. The limiting assembly 30 may be detached when it is not used. The spacing frame 31 is made of a material selected from at least one of PET, PS, PP, and ABS. In the present embodiment, PET is utilized. The limiting stopper 32 made of an anti-static buffer material is flexibly connected to the spacing frame 31 and is able to slide in the reverse U-shaped spacing frame 31. The limiting stopper 32 is made of, for example, EVA or PE.

Figure 7:
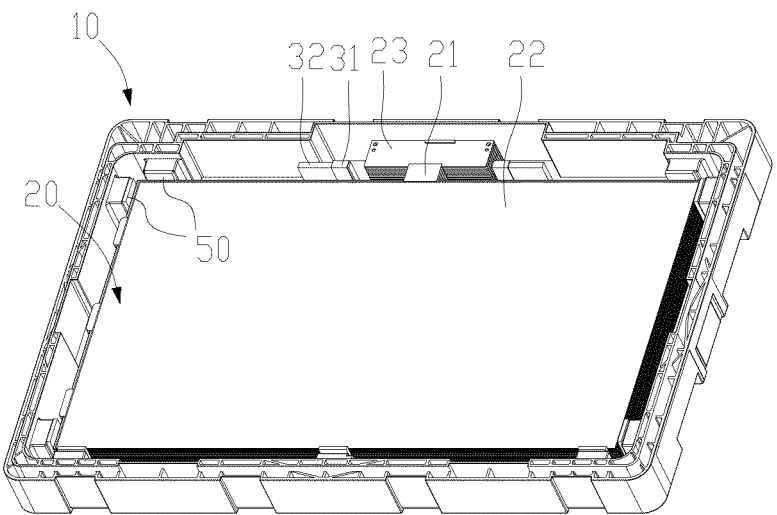
FIG. 7 is a schematic diagram showing limiting assemblies in open state when the tray accommodating an open cell LCD panel.
Figure 8:
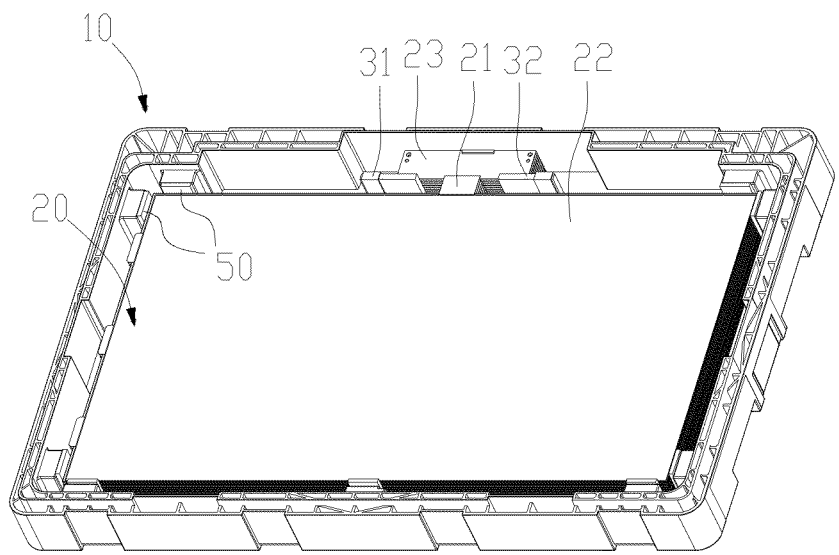
FIG. 8 is a schematic diagram showing limiting assemblies in close state when the tray accommodating the open cell LCD panel.

In the following, FIG. 7 and FIG. 8 are also referred to further elaborate on a specific installation position and working principle of the limiting assembly.

First, the spacing frames 31 are mounted on outer sides of the gaps between the PCB 23 and the liquid crystal box 22 of the open cell LCD panel A 20. As shown in the figures, the spacing frames 31 are adhesively fixed in the gaps between the PCB 23 and the liquid crystal box 22 at both sides of the PCB 23 of the open cell LCD panel A 20. Then the limiting stoppers 32 are placed in the spacing frames 31 to allow the limiting stoppers 32 to slide towards both sides. When the limiting stoppers 32 move towards the COF 21, namely slide towards the center, they will be gradually inserted into the gaps between the PCB 23 and the liquid crystal box 22 to limit the PCB 23. When considering the structure and limiting effect of the limiting assembly 30, the limiting assembly 30 may be designed in such a manner so that at least one portion of the limiting stopper 32 is engaged in the above-mentioned gap when it slides towards the COF 21 to the extent that one of its ends completely enters into the spacing frame 31 as shown in FIG. 8. The limiting assemblies 30 may be mounted to predetermined positions before the open cell LCD panel A 20 is positioned. At this time, the limiting stoppers 32 must slide outwardly followed by positioning the open cell LCD panel A 20 as shown in FIG. 7. After that, the limiting stoppers 32 of the limiting assemblies 30 at both sides are slid towards the center so that the limiting stoppers 32 are inserted into the gaps between the PCB 23 and the liquid crystal box 22 to limit the PCB 23. Hence, the PCB 23 is separated from the liquid crystal box 22.

The limiting assembly 30 is mounted through the adhesive layer 40 disposed on the bottom of each of the footings 311 of the spacing frame 31. When the tray is used for positioning the open cell LCD panel B, the unnecessary limiting assembly 30 can be removed without changing the structure of the tray. In order to increase the protection of the open cell LCD panel, anti-static buffer sheets 50 are disposed on inner side walls of the main body of tray 10 which are connected to the liquid crystal box 22.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A tray having limiting structures for packaging an open cell liquid crystal display panel comprising a main body of tray, the main body of tray having a recess for positioning the open cell liquid crystal display panel, the main body of tray further comprising limiting assemblies, each of the limiting assemblies being connected to a bottom plate of the main body of tray in the gap between a PC board and a liquid crystal box of the open cell liquid crystal display panel, wherein the limiting assembly is constituted by a spacing frame and a limiting stopper in the spacing frame; the spacing frame is mounted on an outer side of the gap between the PC board and the liquid crystal box of the open cell liquid crystal display panel, the limiting stopper is slidingly connected to the spacing frame, and when the limiting stopper slides towards the chip-on-film to the extent that one of its ends completely enters into the spacing frame, at least one portion of the limiting stopper is engaged in the gap.

2. The tray having limiting structures as claimed in claim 1, wherein the spacing frame is a reverse U-shaped spacing frame, and two footings of the spacing frame extend towards two lateral sides and are on the same plane.

3. The tray having limiting structures as claimed in claim 2, wherein an adhesive layer is disposed on a bottom of each of the two footings of the spacing frame to allow the spacing frame be stuck to the bottom plate of the main body of tray of the tray.

4. The tray having limiting structures as claimed in claim 3, wherein the spacing frame is made of PET.

5. The tray having limiting structures as claimed in claim 2, wherein the limiting stopper is flexibly connected to the spacing frame.

6. The tray having limiting structures as claimed in claim 3, wherein the limiting stopper is flexibly connected to the spacing frame.

7. The tray having limiting structures as claimed in claim 1, wherein the limiting stopper is made of an anti-static buffer material.

8. The tray as claimed in claim 1, wherein anti-static buffer sheets are disposed on inner side walls of the main body of tray which are connected to the liquid crystal box.

* * * * *